United States Patent
Maenpaa et al.

(10) Patent No.: US 11,232,421 B2
(45) Date of Patent: Jan. 25, 2022

(54) METHOD AND SYSTEM TO PURCHASE FROM POSTS IN SOCIAL MEDIA SUES

(71) Applicant: MasterCard International Incorporated, Purchase, NY (US)

(72) Inventors: Pia Maenpaa, White Plains, NY (US); Danielle Jean Eininger, New City, NY (US); Matthew Harris, St. Peters, MO (US); Heather L. Thomas, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 746 days.

(21) Appl. No.: 15/071,353

(22) Filed: Mar. 16, 2016

(65) Prior Publication Data

US 2017/0270498 A1     Sep. 21, 2017

(51) Int. Cl.
*G06Q 30/00* (2012.01)
*G06Q 20/12* (2012.01)
(Continued)

(52) U.S. Cl.
CPC ............. *G06Q 20/12* (2013.01); *G06Q 20/34* (2013.01); *G06Q 20/4012* (2013.01);
(Continued)

(58) Field of Classification Search
None
See application file for complete search history.

(56) References Cited

U.S. PATENT DOCUMENTS 6,826,594 B1    11/2004 Pettersen
7,149,754 B2    12/2006 Miller et al.
(Continued)

FOREIGN PATENT DOCUMENTS

KR    10-0867005 B1    11/2008

OTHER PUBLICATIONS

Notification of Transmittal of the International Search Report and the Written Opinion of the International Searching Authority (Forms PCT/ISA/220, PCT/ISA/210 and PCT/ISA/237) dated Jun. 25, 2013, by the Korean Intellectual Property Office in corresponding International Application No. PCT/US2013/032013. (13 pages).

*Primary Examiner* — Michael W Schmucker
(74) *Attorney, Agent, or Firm* — Buchanan Ingersoll & Rooney PC

(57) ABSTRACT

A method for shopping from a social media site using a direct buy link comprises electronically storing a plurality of account profiles and receiving a data message electronically transmitted via a communication network. The method may query a social media database for an account profile associated with the consumer identifier and the PIN. The method may display a plurality of direct buy links associated with a plurality of products for purchase, wherein at least one of the direct buy links is a modified direct buy link. The method may receive a data message electronically transmitted via the communication network and display the modified direct buy link comprising the personal data corresponding to the product, a purchase data, and payment preference information. The method may transmit confirmation of payment and the modified direct buy link associated with the purchased product to the consumer device.

14 Claims, 8 Drawing Sheets

(51) Int. Cl.
*G06Q 30/06* (2012.01)
*G06Q 30/02* (2012.01)
*G06Q 20/40* (2012.01)
*G06Q 20/42* (2012.01)
*G06Q 50/00* (2012.01)
*G06Q 20/34* (2012.01)

(52) U.S. Cl.
CPC ......... *G06Q 20/42* (2013.01); *G06Q 30/0226* (2013.01); *G06Q 30/0617* (2013.01); *G06Q 30/0625* (2013.01); *G06Q 30/0641* (2013.01); *G06Q 50/01* (2013.01)

(56) References Cited

U.S. PATENT DOCUMENTS

| | | |
|---|---|---|
| 7,240,075 B1 | 7/2007 | Nemirofsky et al. |
| 8,250,145 B2 * | 8/2012 | Zuckerberg ............ G06Q 30/02 709/204 |
| 9,875,497 B1 * | 1/2018 | Kotas ................ G06Q 30/0625 |
| 2003/0095525 A1 | 5/2003 | Lavin et al. |
| 2003/0158792 A1 | 8/2003 | Perkowski |
| 2009/0077034 A1 | 3/2009 | Kim et al. |
| 2009/0231293 A1 | 9/2009 | Nakayama |
| 2009/0234730 A1 * | 9/2009 | Lee ....................... G06Q 30/02 705/14.73 |
| 2011/0082735 A1 | 4/2011 | Kannan et al. |
| 2012/0069131 A1 | 3/2012 | Abelow |
| 2014/0279068 A1 * | 9/2014 | Systrom ............. G06Q 30/0277 705/14.73 |

* cited by examiner

METHOD AND SYSTEM TO PURCHASE FROM POSTS IN SOCIAL MEDIA SUES

FIELD

The present disclosure relates to purchasing from posts in social media sites, specifically by posting a direct buy link on a social media site and shopping from a social media site using a direct buy link.

BACKGROUND

Consumers today distrust traditional marketing and seek recommendations and ideas from their friends and networks they trust, thus creating a great opportunity for the social media and networking platforms to provide shopping experiences for their user. Merchants, retailers, advertisers, and other content providers are always looking for new ways to not only identify useful content, but to also identify new and improved ways to target recipients for the content and to distribute the content to the recipients. For merchants the shopping card abandonment presents a challenge that can be remedied by making the shopping and checkout experience as frictionless and pleasant for the shoppers as possible.

As social networks become more and more prevalent in the daily life of countless consumers, content providers have begun to use social networks as a way to reach target audiences. Many merchants allow consumers to purchase from "buyable pins" on the online scrapbooking sites. Some merchants have embedded "Buy" buttons in their tweets so that consumers may instantly purchase products through a social networking service. On-line magazines have embedded images shown in their magazine with purchase links and shopping sites have enabled posting review information about the purchased item by logging into their site.

However, it can be exceedingly difficult for a content provider to identify a suitable individual for sharing of their content, and create an easier shopping experience for the consumer.

Thus, there is a need for a technical solution to promote individuals sharing their purchases with their networks to provide an easier way for merchants to promote and sell their products.

SUMMARY

The present disclosure relates to purchasing from posts in social media sites, specifically by posting a direct buy link on a social media site and shopping from a social media site using a direct buy link.

A method for posting a direct buy link on a social media site comprises storing, in a merchant database of a processing server, a plurality of account profiles and a plurality of product identifiers. Each account profile of the plurality of account profiles may include at least a consumer identifier and reward data. Each product identifier of the plurality of product identifiers may include a direct buy link configured to provide purchase data for a corresponding product. The method may comprise receiving, by a receiving device of the processing server from a consumer device, a data message electronically transmitted via a communication network. The data message may be superimposed with selection of a direct buy link corresponding to a product identifier. The direct buy link may provide purchase data for the product. The method may comprise receiving, by the receiving device of the processing server from a social media network, a data message electronically transmitted via the communication network. The data message may be superimposed with a consumer identifier and data corresponding to the posting of the direct buy link on the social media network. The posting of the direct buy link may comprise a modification of the direct buy link. The method may comprise querying, by a querying module of the processing server, the merchant database for an account profile associated with the consumer identifier. The method may comprise electronically storing, in the merchant database of the processing server, the reward data for posting the direct buy link on the social media network and the modified direct buy link in the account profile associated with the consumer identifier.

A method for shopping from a social media site using a direct buy link, may comprise electronically storing, in a social media database of a processing server, a plurality of account profiles. Each account profile of the plurality of account profiles may include at least a consumer identifier and a personal identification number (PIN). The method may comprise receiving, by a receiving device of a processing server from a consumer device, a data message electronically transmitted via a communication network. The data message may be superimposed with a consumer identifier and a PIN. The method may comprise querying, by a querying module of the processing server, the social media database for an account profile associated with the consumer identifier and the PIN. The method may comprise displaying, by a processing device of the processing server, a plurality of direct buy links associated with a plurality of products for purchase. In some implementations, at least one of the direct buy links may be a modified direct buy link. The method may comprise receiving, by the receiving device of the processing server from the consumer device, a data message electronically transmitted via the communication network. The data message may be superimposed with selection of the modified direct buy link which provides a purchase data for a product and a personal data corresponding to the product. The method may comprise displaying, by the processing device of the processing server, the modified direct buy link comprising the personal data corresponding to the product, a purchase data, and payment preference information. The method may comprise transmitting, by a transmitting device, confirmation of payment and the modified direct buy link associated with the purchased product to the consumer device. The account profile may be updated to be associated with the modified direct buy link.

A system for posting a direct buy link on a social media site may comprise a merchant database of a processing server configured to store a plurality of account profiles and a plurality of product identifiers. Each account profile of the plurality of account profiles may include at least a consumer identifier and reward data, and each product identifier of the plurality of product identifiers includes a direct buy link configured to provide purchase data for a corresponding product. The system may comprise a receiving device of the processing server configured to receive from a consumer device a data message electronically transmitted via a communication network. The data message may be superimposed with selection of a direct buy link corresponding to a product identifier. The direct buy link may provide purchase data for the product. The receiving device of the processing server may be configured to receive from a social media network a data message electronically transmitted via the communication network, wherein the data message is superimposed with a consumer identifier and data corresponding to the posting of the direct buy link on the social media network. The posting of the direct buy link may comprise a modification of the direct buy link. A querying module of the processing server may be configured to query the merchant database for an account profile associated with the consumer identifier. The merchant database of the processing server may be configured to electronically store the reward data for posting the direct buy link on the social media network and the modified direct buy link in the account profile associated with the consumer identifier.

A system for shopping from a social media site using a direct buy link may comprise a social media database of a processing server configured to electronically store a plurality of account profiles. Each account profile of the plurality of account profiles may include at least a consumer identifier and a personal identification number (PIN). A receiving device of a processing server may be configured to receive from a consumer device, a data message electronically transmitted via a communication network. The data message may be superimposed with a consumer identifier and a PIN. A querying module of the processing server may be configured to query the social media data base for an account profile associated with the consumer identifier and the PIN. A processing device of the processing server may be configured to display a plurality of direct buy links associated with a plurality of products for purchase. At least one of the direct buy links may be a modified direct buy link. A receiving device may be configured to receive a data message electronically transmitted via the communication network. The data message may be superimposed with selection of the modified direct buy link which provides a purchase data for a product and a personal data corresponding to the product. The processing device may further configured to display the modified direct buy link comprising the personal data corresponding to the product, a purchase data, and payment preference information. A transmitting device may be configured to transmit confirmation of payment and the modified direct buy link associated with the purchased product to the consumer device, wherein the account profile is updated to be associated with the modified direct buy link.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
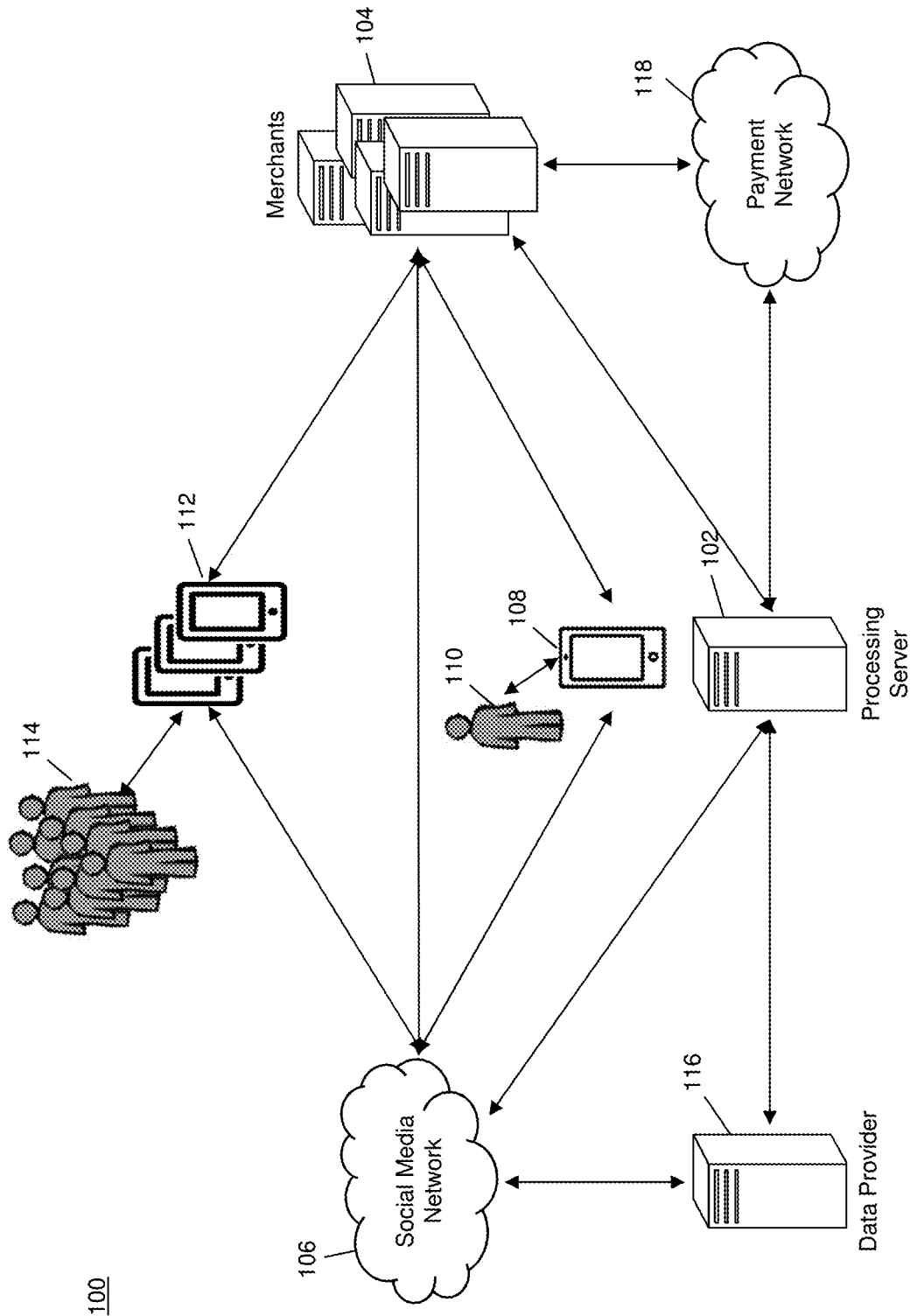
FIG. 1 is a block diagram illustrating a high-level system architecture for purchasing from posts in social media sites in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Data provider 116—The data provider 116 may be an entity which is configured to collect social network data from the social network. The social network data may include data related to content shared by users of the social network, as well as information associated with individual users and their followers. In an exemplary embodiment, the social network data collected by the data provider 116 may be data that the individual has given permission for the collection thereof (e.g., by "opting-in" to the collection of the social network data). In some instances, the data collected regarding the individual's followers may only be collected for those followers that have also opted-in for data collection. The data provider 116 may be configured to electronically transmit data signals to the processing server that are superimposed with the social network data using a suitable communication network, such as the Internet, a local area network, a wireless area network, a radio frequency network, etc. In some instances, the data provider 116 may electronically transmit data signals associated with each user of the social network. In other instances, the data provider 116 may aggregate user social network data in data signals that are electronically transmitted to the processing server, such as to reduce the number of transmissions.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have and require special knowledge in offered products. In some embodiments, an entity involved in a single transaction may be considered a merchant. In some instances, as used herein, the term "merchant" may refer to an apparatus or device of a merchant entity.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Social Network—A social network may be an entity that operates a network which hosts social websites. The social network may also operate the hardware and/or software used in the management and operation of the network, such as the websites and application programs used by the individual and their followers in accessing the network. Social networks may include, for example, Facebook, Twitter, FourSquare, Snapchat, Google+, YouTube, etc. The social network may provide for a network of social interactions and relationships that is used by individuals to manage the relationships and interactions and share content with their followers in the social network, such as by sharing images, audio, video, text, etc.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

System for Purchasing from Posts in Social Media Sites

FIG. 1 is a block diagram 100 illustrating a high-level system architecture for purchasing from posts in social media sites in accordance with exemplary embodiments.

The system 100 may include a processing server 102. The processing server 102, discussed in more detail below, may be configured to post a direct buy link on a social media site and provide the ability to shop from a social media site using a direct buy link. In order to post a direct buy link on a social media network 106 (also referred to as a social media site, and/or social network), the processing server 102 may store in a database, a plurality of account profiles and a plurality of product identifiers. Each account profile of the plurality of account profiles may include at least a consumer identifier and reward data. A consumer identifier may be any numeric and/or alphanumeric code representing for an individual consumer 110.

The plurality of account profiles may be linked to a plurality of consumers 114, each having a consumer identifier which may be linked to a plurality of consumer devices 112. The reward data may be based on points a consumer 110 may collect for posting purchases on a social media network 106. For example, if the consumer 110 posts three purchases on the social media network 106, the consumer 110 may be rewarded a certain amount of points associated with the posting. In some implementations, the consumer 110 may also be rewarded points based on the number of plurality of consumers 114 that view the post and/or purchase from the post. The reward data may further of comprise of one or more of: a coupon towards next purchase, merchant cash redeemable towards next purchase, and/or free products provided by the merchant.

The consumer 108 may be an individual who is a part of one or more social media networks 106. A social media network 106 may be a network of social interactions and relationships that is used by the individual to manage the relationships and interactions and share content with their followers in the social media network 106, such as by sharing images, audio, video, text, etc. As used herein, "social network" may refer to an entity that operates a social network, as well as the hardware and/or software used in the management and operation of the social network, such as the websites and application programs used by the individual and their followers in accessing the social network. Social media networks 106 may include, for example, Facebook, Twitter, FourSquare, Snapchat, Google+, YouTube, etc.

Followers may be other users and/or a plurality of consumers 114 who also participate in the social media network 106 that "follow" the individual, and are therefore recipients of content shared by the individual. When content, such as a message, image, or video, is shared by the individual, each of the followers may receive or otherwise be able to view the shared content. Each of the followers may also have followers of their own that view content shared by them, which may include individually produced content, or may be a re-sharing of the content shared by the individual. The aggregate pool of users that comprise followers of the followers may be referred to herein as secondary followers.

Each product identifier of the plurality of product identifiers may include a direct buy link configured to provide purchase data for a corresponding product. For example, if the consumer 110 posts a dress purchase from store A, the post may have a link so that the plurality of consumers 114 viewing the dress on the social media network 106 may click on the link to purchase the dress. The purchase data may comprise of one or more of: a size data of the product, an image of the product, a price of the product, a product description of the product, and a quantity of the product.

The processing server 102 may receive from a consumer device 108, a data message electronically transmitted via a communication network. The data message may be superimposed with selection of a direct buy link corresponding to a product identifier. The direct buy link may provide purchase data for the product. Selection of the direct buy link may be from one or more of: a product page, and a checkout page by a consumer 110 from a consumer device 108.

The processing server 102 may receive from a social media network 106 and/or social media site, a data message electronically transmitted via the communication network. The data message may be superimposed with a consumer identifier and data corresponding to the posting of the direct buy link on the social media network 106. Posting of the direct buy link may comprise a modification of the direct buy link. The modification of the direct buy link may include updating the purchase data with at least one of: providing an additional image of the product, replacing the image of the product, and/or modifying the description of the product. The modification of the direct buy link may be received from the consumer device 108 via the social media network 106. For example, the consumer 108 may post their own image of the dress they purchased.

The processing server 102 may query, the database for an account profile associated with the consumer identifier and store in a database the reward data for posting the direct buy link on the social media network 106 and the modified direct buy link in the account profile associated with the consumer identifier.

In order to provide a system for shopping from a social media network 106 using a direct buy link the processing server 102 may electronically store in a database a plurality of account profiles. Each account profile of the plurality of account profiles may include at least a consumer identifier and a personal identification number (PIN).

The processing server 102 may receive from a consumer device 108, a data message electronically transmitted via a communication network. The data message may superimposed with a consumer identifier and a PIN. The processing server 102 may query a database for an account profile associated with the consumer identifier and the PIN.

The processing device 102 may display a plurality of direct buy links associated with a plurality of products for purchase. In some implementations, at least one of the direct buy links is a modified direct buy link. The processing device 102 may receive from the consumer device 108, a data message electronically transmitted via the communication network. The data message may be superimposed with selection of the modified direct buy link which provides a purchase data for a product and a personal data corresponding to the product. The purchase data may comprise one or more of: a size data of the product, an image of the product, a price of the product, a product description of the product, and a quantity of the product. The personal data may corresponding to the product may comprise at least one of: providing an additional image of the product, replacing the image of the product, and modifying the description of the product; wherein the personal data corresponding to the product is uploaded from an account profile associated with a second consumer identifier.

The processing server 102 may display the modified direct buy link comprising the personal data corresponding to the product, a purchase data, and payment preference information. The processing server 102 may transmit confirmation of payment and the modified direct buy link associated with the purchased product to the consumer device 108. The account profile may updated to be associated with the modified direct buy link.

The system 100 may include a data provider 116. The data provider 116 may be configured to collect social network data from the social media network 106. The social network data may include data related to content shared by users of the social media network 106, as well as information associated with individual users and their followers, such as the consumer 110, and the plurality of consumers 114 (e.g., followers). In an exemplary embodiment, the social network data collected by the data provider 116 may be data that the consumer 110 has given permission for the collection thereof (e.g., by "opting-in" to the collection of the social network data). In some instances, the data collected regarding the individual's followers and/or secondary followers may only be collected for those followers and secondary followers that have also opted-in for data collection. The data provider 116 may be configured to electronically transmit data signals to the processing server 102 that are superimposed with the social network data using a suitable communication network, such as the Internet, a local area network, a wireless area network, a radio frequency network, etc. In some instances, the data provider 116 may electronically transmit data signals associated with each user of the social media network 106. In other instances, the data provider 116 may aggregate user social network data in data signals that are electronically transmitted to the processing server 102, such as to reduce the number of transmissions.

In some embodiments, the processing server 102 may electronically transmit a data signal to the data provider 116 using a suitable communication network that is superimposed with a social network data request. The social network data request may identify the consumer 110 for which social network data is requested, such as by including an identifier associated with the consumer 110. In some instances, the social network data request may also specify one or more criteria for use in the identification of social network data, such as by specifying a date range for shared content, a filter for the identification of content shared by the consumer 110, etc. For example, if the processing server 102 is identifying the influence of the consumer 110 with respect to a specific product, the social network data request may identify the specific product such that the data provider 116 may identify instances where content shared by the consumer 110 is associated with that product, such as by using a product identifier, such as a universal product code, stock keeping unit, manufacturer's part number, product name, product image, etc.

The processing server 102 may use the social network data to evaluate the influence of the consumer 110 on the social media network 106 in conjunction with transaction data in order to determine the amount of points to reward the consumer 110. Transaction data may be captured for payment transactions involving the consumer 110, the plurality of consumers 114 (e.g., followers and the secondary followers). Each of the users of the social media network 106 may conduct payment transactions with a plurality of merchants 104 using traditional systems and methods. Some or all of the payment transactions may be processed by a payment network 118 using traditional systems and methods, such as discussed in more detail below with respect to the process 500 illustrated in FIG. 5. The payment network 118 may receive transaction messages for payment transactions involving the merchants 104 and users of the social media network 106. Transaction messages may be data messages specially formatted pursuant to one or more standards governing the exchange of financial transaction messages, such as the International Organization for Standardization's ISO 8583 standard. Each transaction message may include a plurality of data elements configured to store data as set forth by the associated standard(s), such as data elements configured to store a primary account number associated with a transaction account used to fund the payment transaction, an identifier associated with the merchant 114 involved in the transaction, a transaction amount, a geographic location, a transaction time, a transaction date, product data, merchant data, consumer data, offer data, reward data, loyalty data, point of sale data, etc.

The payment network 118 may electronically transmit transaction messages for payment transactions to the processing server 102. In some instances, the transaction messages may be transmitted via data signals transmitted using the payment rails, which may be specialized infrastructure associated with the payment network 118, as discussed in more detail below. In other instances, the transaction messages may be transmitted using an alternative, suitable communication network. In some embodiments, the processing server 102 may electronically transmit a data signal superimposed with a transaction request to the payment network 118, which may request transaction messages for payment transactions. In some cases, the transaction request may include information associated with a valuation being performed by the processing server 102, such as requesting transaction messages related to transactions for the purchase of the product or merchant associated with the content shared by the consumer 110, requesting transaction messages for transactions in a specific time and/or date range, requesting transaction messages in a specific geographic area, etc.

In some embodiments, the processing server 102 may be a part of the payment network 118. In such embodiments, the processing server 102 and/or payment network 118 may store transaction messages for payment transactions processed by the payment network 118 for use in performing the functions discussed herein. In such instances, the processing server 102 may receive transaction messages via internal communication networks of the payment network 118 or may access transaction messages stored in a database associated with the payment network 118 that may be stored locally in the payment network 118 or externally and accessed via a suitable communication method, such as via cloud computing techniques.

By collecting transaction data from transaction messages at a payment network 118, the processing server 102 may capture transaction data at a centralized point in the transaction process without the need to aggregate data from multiple merchants and locations and thus may also capture transaction data without modification to existing merchant transaction systems, by virtue of the technical configuration of the processing server 102.

Processing Server

Figure 2:
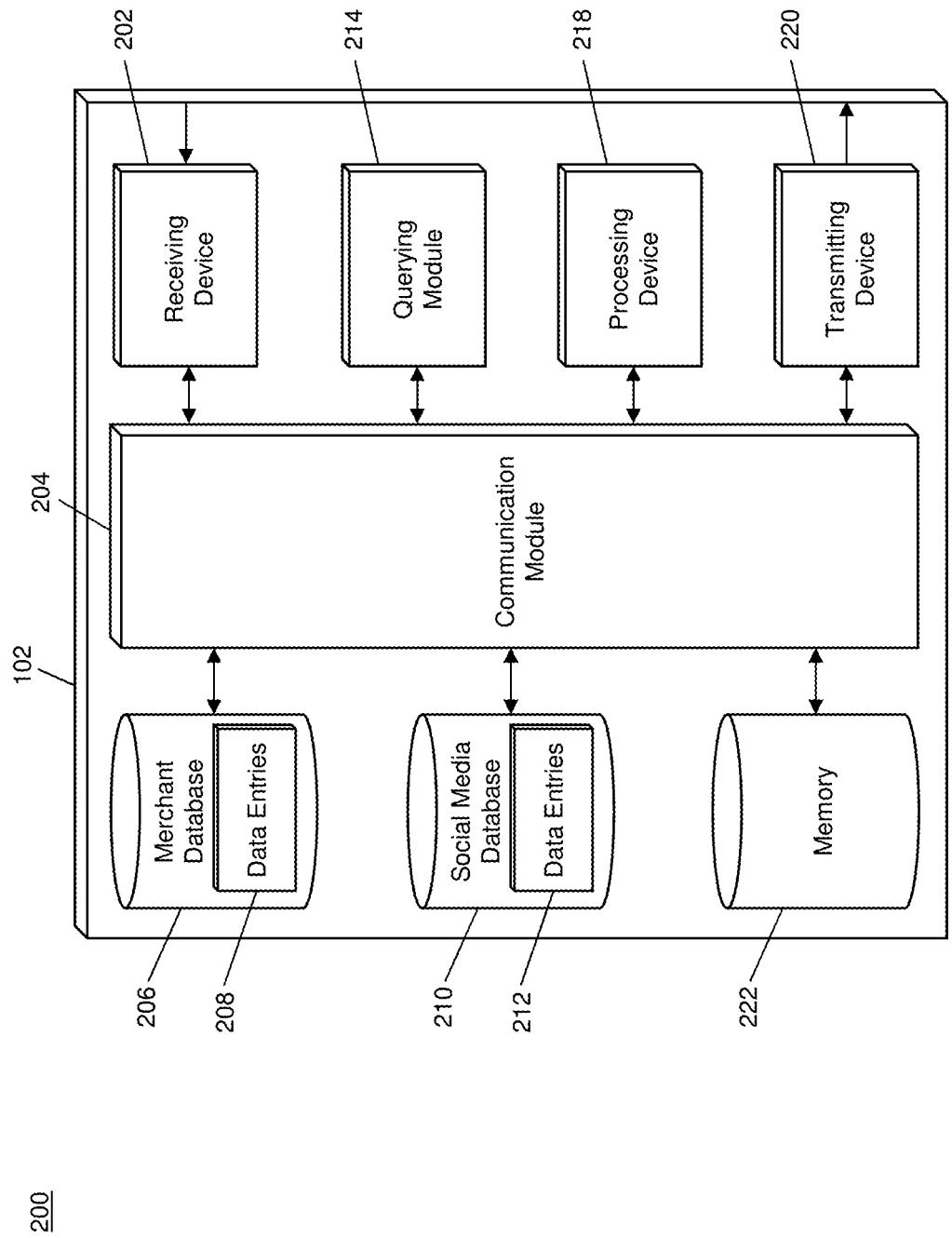
FIG. 2 is a block diagram illustrating the processing server of FIG. 1 for purchasing from posts in social media sites in accordance with exemplary embodiments.

FIG. 2 is a block diagram 200 illustrating the processing server 102 of FIG. 1 for purchasing from posts in social media sites in accordance with exemplary embodiments.

It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a merchant database 206. The processing server 102 may post a direct buy link on a social media site by storing, in the merchant database 206 a plurality of data entries 208. The data entries may comprise of a plurality of account profiles and a plurality of product identifiers. Each account profile of the plurality of account profiles may include at least a consumer identifier and reward data. Each product identifier of the plurality of product identifiers may include a direct buy link configured to provide purchase data for a corresponding product. The purchase data may comprise one or more of: a size data of the product, an image of the product, a price of the product, a product description of the product, and/or a quantity of the product. The reward data may comprise one or more of: a coupon towards next purchase, merchant cash redeemable towards next purchase, and/or free products provided by the merchant. The processing server 102 may store in the reward data for posting the direct buy link on the social media network and the modified direct buy link in the account profile associated with the consumer identifier in the merchant database 206.

The processing server 102 may comprise a social media database 210. The processing server 102 may provide a method for shopping from a social media site using a direct buy link by electronically storing, in a social media database 210, plurality of data entries 212. The plurality of data entries 212 stored in the social media database 210 may comprise of a plurality of account profiles. Each account profile of the plurality of account profiles may include at least a consumer identifier and a personal identification number (PIN).

The processing server 102 may include a receiving device 202. The processing server 102 may provide a method for posting a direct buy link on a social media site by receiving, by the receiving device 202 from a consumer device, a data message electronically transmitted via a communication network. The data message may be superimposed with selection of a direct buy link corresponding to a product identifier. The direct buy link may provide purchase data for the product. Selection of the direct buy link may be from one or more of: a product page, and/or a checkout page.

In some implementations, the data message may be superimposed with a consumer identifier and data corresponding to the posting of the direct buy link on the social media network. The posting of the direct buy link may comprise a modification of the direct buy link. The modification of the direct buy link may include updating the purchase data with at least one of: providing an additional image of the product, replacing the image of the product, and/or modifying the description of the product. The modification of the direct buy link may be received from the consumer device via the social media network.

The processing server 102 may provide method for shopping from a social media site using a direct buy link by receiving, by the receiving device 202 from a consumer device, a data message electronically transmitted via a communication network. The data message may be superimposed with a consumer identifier and a PIN. In some implementations the data message may be superimposed with selection of the modified direct buy link which provides a purchase data for a product and a personal data corresponding to the product. The purchase data may comprise one or more of: a size data of the product, an image of the product, a price of the product, a product description of the product, and/or a quantity of the product. The personal data corresponding to the product may comprise at least one of: providing an additional image of the product, replacing the image of the product, and modifying the description of the product. In some implementations, the personal data corresponding to the product may be uploaded from an account profile associated with a second consumer identifier.

The receiving device 202 may be configured to receive data over one or more networks via one or more network protocols. In some embodiments, the receiving device 202 may be configured to receive data over the payment rails, such as using specially configured infrastructure associated with payment networks for the transmission of transaction messages that include sensitive financial data and information. In some instances, the receiving device 202 may also be configured to receive data from data provider, social media networks, merchants, payment networks, and/or other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet.

The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals from the data provider and/or social media network using a suitable communication network that are superimposed with social network data. The social network data may include at least a number of followers for consumer, a number of secondary followers for the consumer, and/or sharing data. The sharing data may be associated with content shared by the consumer on the social media network and include at least a time and date at which the content was shared, as well as a data value associated with a product or merchant that is associated with the shared content. In exemplary embodiments, the social network data and/or the sharing data may be received only if expressly consented to by the associated consumer. The data value may be, for example, a product identifier (e.g., universal product code, stock keeping unit, manufacturer's part number, registration number, serial number, international standard book number, etc.) or a merchant identifier (e.g., merchant identification number, transaction account number, registration number, point of sale device identifier, etc.). In some embodiments, social network data may be received in response to a request electronically transmitted to the data provider or social media network by the processing server 102.

The receiving device 202 may also be configured to receive data signals superimposed with transaction messages from the payment network. The transaction messages may be stored in a transaction database of the processing server 102 as transaction messages. The transaction database may be configured to store a plurality of transaction messages using a suitable data storage format and schema. Each transaction message may be formatted based on one or more standards, such as the ISO 8583 standard, and may include a plurality of data elements including at least a first data element configured to store a time, a second data element configured to store a date, and one or more additional data elements configured to store transaction data. The transaction data may include, for example, a primary account number, a merchant identification number, a transaction amount, a geographic location, issuer data, acquirer data, merchant data, point of sale data, product data, etc.

The receiving device 202 may also be configured to receive data signals superimposed with an index request, such as from a content provider or other suitable entity, via a suitable communication network. The index request may identify at least an consumer for which an index is requested, or a product or merchant for whom a suitable consumer is requested, such as one that has shared content associated with the product or merchant or a similar product or merchant. The index request may also include a time and/or date range, a social media network, or other criteria that may be set forth by the content provider to limit, filter, or otherwise modify the data used in the valuation of the influence of the consumer.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may comprise a processing device 218. The processing device 218 may provide a method for shopping from a social media site using a direct buy link by displaying a plurality of direct buy links associated with a plurality of products for purchase. In some implementations, at least one of the direct buy links may be a modified direct buy link. In some implementations, the processing device 218 may display the modified direct buy link comprising the personal data corresponding to the product, a purchase data, and/or payment preference information.

The processing server 102 may comprise a querying module 214. The querying module 214 may provide a method for posting a direct buy link on a social media site by querying the merchant database 206 for an account profile associated with the consumer identifier. The querying module 214 may provide a method for shopping from a social media site using a direct buy link by querying the social media database 210 for an account profile associated with the consumer identifier and the PIN.

The querying module 214 of the processing server 102 may be configured to execute queries on databases to identify data stored therein. The querying module 214 may receive a string or one or more data values as input for which data is requested, may execute a query based thereon on a corresponding database, and may output the identified data entries or values. The querying module may, for example, execute a query on the merchant database 206, social media database 210, and/or transaction database to identify a group of transaction messages where the transaction time and date stored in the respective data elements included therein are within a predetermined period of time of when content was shared by the consumer 110 as based on the received social media data and/or index request, and also where the transaction data stored in the additional data elements corresponds to the product or merchant that was shared.

The calculation module of the processing server 102 may be configured to calculate a rate of return for the consumer on the social media network so that appropriate rewards may be provided to the consumer. The calculation module may receive the group of transaction messages identified by the querying module 214 and the social network data associated with the consumer as input, may calculate a rate of return based thereon, and output the calculated rate of return. The rate of return may be based on at least the number of followers and secondary followers for the consumer that have viewed and/or purchased the products posted by the consumer. The rate of return may also be based on the number of transaction messages in the group of transaction messages. In some embodiments, the rate of return may be the ratio of purchases made to the number of followers and secondary followers to whom the content was shared or potentially shared. In some instances, the rate of return may also be weighted, such as based on the number of followers to secondary followers, such as to account for instances where followers may not re-share content to secondary followers, where secondary followers may include followers, etc. In some instances, such weighting may be based on, for example, the social media network.

The indexing module of the processing server 102 may be configured to generate an index of influence for the consumer. The indexing module may receive at least a rate of return for the consumer, may identify an index for the consumer based thereon, and may output the index. In some instances, the index may be based on a comparison of the rate of return for the consumer with one or more other rates of return. The other rates of return may include rates of return for the consumer for other products or merchants and/or other social media networks, for other users of the same social media network, for other users of the same social media network and the same or similar product or merchant, etc., and a combination thereof. In some instances, the index may be further based on multiple rates of return for the consumer, such as by the index taking into account the rate of return for the consumer for multiple products and/or merchants and/or multiple social networks, which may also take into account rates of return for other users, products, merchants, and/or social media networks. In some cases, rates of return used to identify an index value may be weighted, such as based on the associated social media network, product or merchant, number of followers, number of secondary followers, etc.

The processing server 102 may further include a transmitting device 220. The transmitting device 220 may provide a method for shopping from a social media site using a direct buy link by transmitting confirmation of payment and the modified direct buy link associated with the purchased product to the consumer device. The account profile may be updated to be associated with the modified direct buy link.

The transmitting device 220 may be configured to transmit data over one or more networks via one or more network protocols. In some embodiments, the transmitting device 220 may be configured to transmit data over the payment rails, such as using specially configured infrastructure associated with payment networks 116 for the transmission of transaction messages that include sensitive financial data and information, such as identified payment credentials. In some instances, the transmitting device 220 may be configured to transmit data to data provider, social media networks, merchants, content providers, payment networks, and other entities via alternative networks, such as the Internet. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit a data signal to a content provider, such as in response to a received index request. The data signal may be superimposed with an index value identified by the indexing module. In some instances, the data signal may also be superimposed with additional value associated thereto, such as contact information for the consumer if available, social network data, rate of return data, index values for other users, etc. In some embodiments, the transmitting device 220 may also be configured to electronically transmit data signals to the data provider and/or payment network, such as may be superimposed with requests for data, such as social network data and transaction data. In such embodiments, the requests may specify criteria for which data is requested, such as for the consumer 110, for a date and/or time range, involving a specific product or merchant, etc.

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art.

Process for Purchasing from Posts in Social Media Sites

Figure 3A:
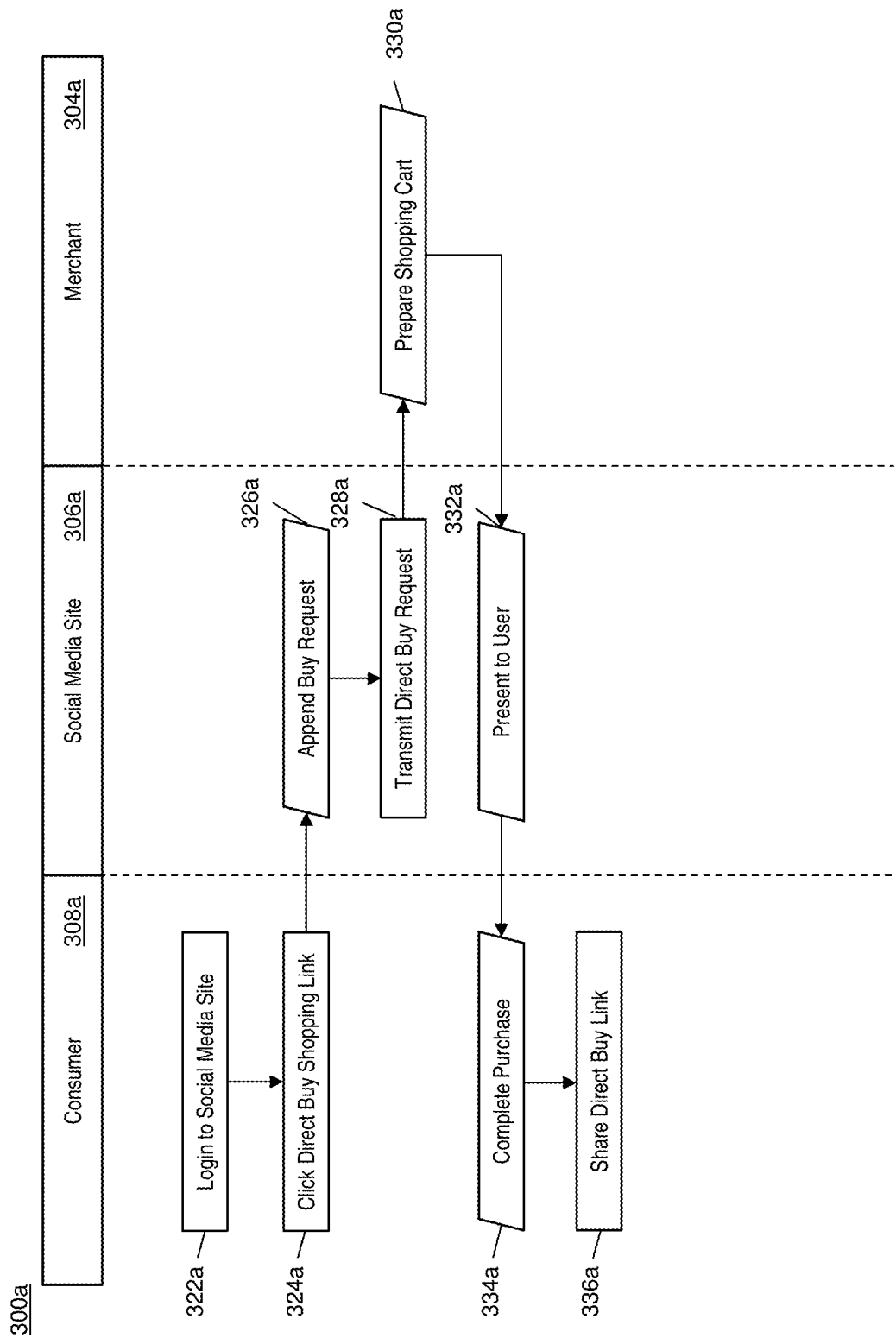
FIGS. 3A and 3B are flow diagrams illustrating a process for purchasing from posts in social media sites using the system of FIG. 1 in accordance with exemplary embodiments.

FIG. 3A is flow diagram 300a illustrating a process for purchasing from posts in social media sites using the system of FIG. 1 in accordance with exemplary embodiments.

Many consumers distrust traditional marketing and seek recommendations and ideas from their friends and networks they trust. Therefore there is a great opportunity for the social media and networking platforms to provide shopping experiences for their user. For merchants the shopping card abandonment presents a challenge that can be remedied by making the shopping and checkout experience as frictionless and pleasant for the shoppers as possible.

The system described enables consumers to post actionable shopping links to their social media accounts to be available for their friends and networks. The system also proposes a method for merchants to generate a link that the consumers can post. In addition, the system proposes a method that social media platforms can further facilitate the shopping experience by providing the consumer's payment credentials to the merchant and thereby enabling one-click shopping.

In step 322a, a consumer 308a may login to a social media site and access their account profile and browse through other social media pages. In step 324a, the consumer 308a may click a direct buy shopping link and/or image a friend has posted. In some implementations, when a consumer 308a is browsing and/or buying items online, the consumer 308a may access links the merchant 304a provides. These links may be copied and posted to any social media site 306a the consumer 308a visits.

In step 366a, the social media site 306a may append direct buy request with the consumer's payment preference and transmit the direct buy request to the merchant in step 328a. In step 330a the merchant may prepare a shopping cart with the item(s) and payment preference/information received from the social media site 306a and/or from the consumer 308a. In step 332a, the social media site 306a may present the consumer 308a with a purchase completed confirmation (e.g., one click) and a payment confirmation screen (e.g., MasterPass, card-on-file, enter card details). In some implementations, if the consumer 308a has provided their payment credentials for the social media site 306a, the site can facilitate the payment by directly providing payment information to the merchant 304a and the purchase can happen with one click. If there are no payment credentials available, the merchant shopping cart opens and consumer 308a may checkout normally at the merchant site.

In step 334a, the purchase may be completed, and the consumer 308a may be able to share the direct buy link in step 336a. For example, after buying an item the consumer 308a may click the link of the chosen social media site 306a and the item(s) purchased are made available for posting so that a consumer 308a may share the direct buy link on their social media site 306a and/or plurality of social media sites. The posting may consist of an image (e.g., taken by the consumer 308a and/or provided by the merchant 304a) of the merchandise or service as well as a link to purchase it directly from the merchant 304a. If the purchase was made in store the consumer 308a could also take a picture of them with the item and add it directly to the posting.

In some implementations, after the purchase is made, the consumer 308a may obtain a confirmation from the merchant 304a. Confirmation may be embedded on the social media site 306a facilitating the purchase and it can also be emailed to the consumer 308a separately. In some implementations, after purchase using the direct buy link on a social media site 306a the consumer 308a can further post notification about their purchase and hence spread the shopping opportunity to their own network.

Figure 3B:
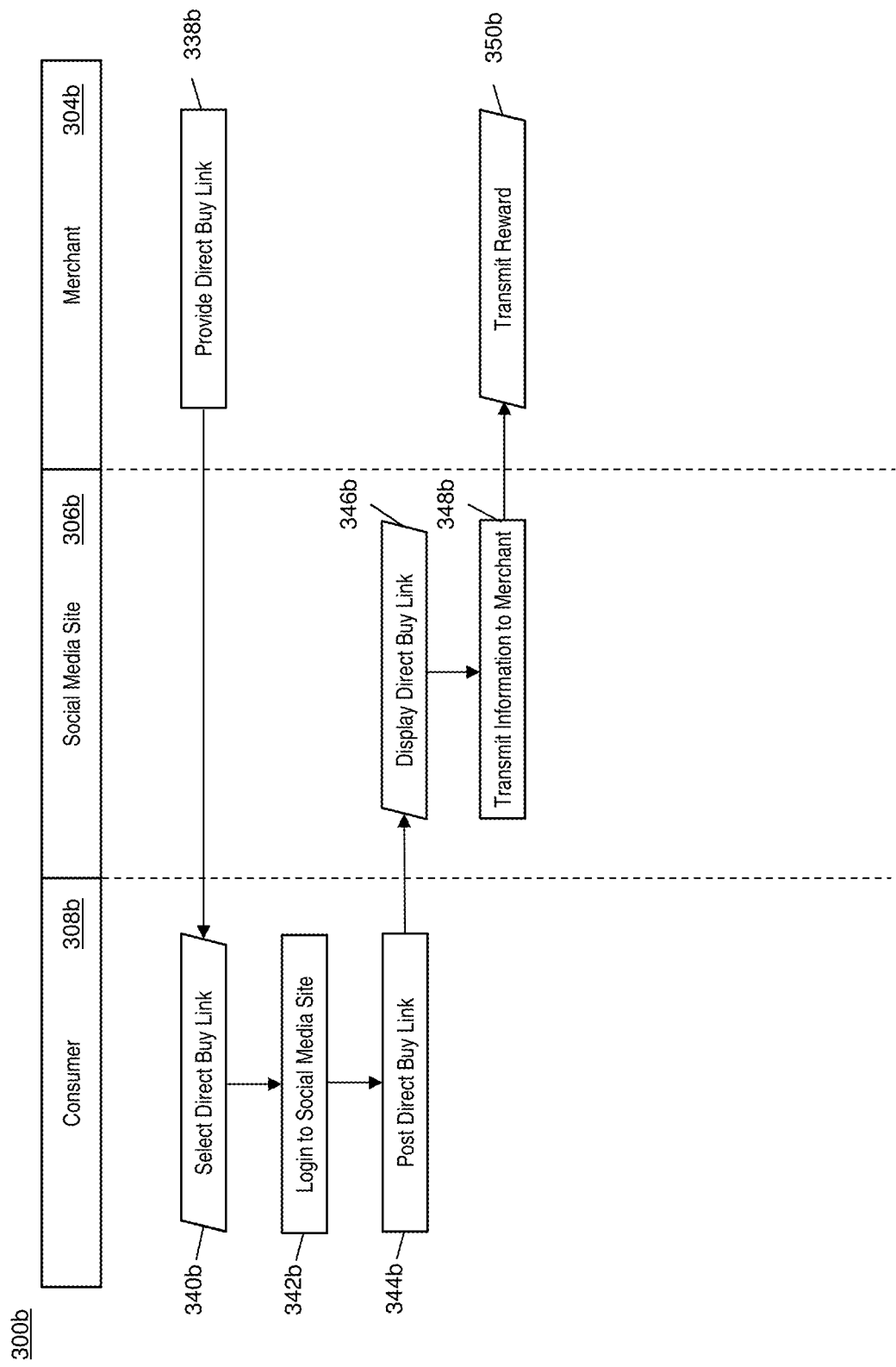

FIG. 3B is a flow diagram 300b illustrating enabling consumers 308b of social media sites 306b such as Facebook, Twitter, Instagram, and LinkedIn etc. to post images and information about purchases they have made or are planning to make. Thus, presenting an opportunity for their friends to acquire the same item when they see it posted by their friends. The system enables consumers 308b to post direct purchase links together with the images and information they post. In addition there is an opportunity for merchants 304b to reward consumers 308b who have a positive impact on sales by posting items to their social media sites 306b, thereby increasing sales. Merchants 304b can enable their customers to advertise and sell their products to their private networks. Social media sites 306b can facilitate one click purchase experience for merchants 304b whose shopping links are posted on their site.

In step 338b, merchants 304b may provide direct buy links for their merchandise and/or services purchased and/or viewed by the consumer 308b. In some implementations, the consumer 308*b* does not need to purchase the merchandise and/or service in order to post a personal link.

In some implementations, when the consumer 308*b* is viewing an item online or has purchased an item online, the merchant 304*b* can provide a direct buy link that the consumer 308*b* can post to their social media sites 306*b*. This direct buy link may include a link to a shopping cart with this item prepopulated and ready to buy. The direct buy link can also include an image of the item that can be shown on the social media site, and/or the consumer 308*b* may add their own image. When the direct buy link image is used, it indicates that the viewer can purchase the item just by clicking the image.

In step 340*b*, the consumer 308*b* may select a direct buy link (e.g., from item page or from checkout page). In step 342*b*, the consumer may login to the social media site 306*b*. The consumer 308*b* may browse a shopping site and/or optionally sign into site for identification. In step 344*b*, the consumer 308*b* may post the direct buy link to the social media site 306*b*. The consumer 308*b* may share content on a social media site 306*b*. The content may include a data value associated with a product or merchant 304*b*, such as a product or merchant identifier, product or merchant name, product or merchant image, product or merchant audio signal, or other suitable value. The content may be shared at a specific time and date by the consumer 308*b*. The data provider may capture social media data involving the consumer 308*b*, including data associated with the shared content. For example, the data provider may capture a number of followers of the consumer 308*b*, as well as a number of secondary followers.

In step 346*b*, the social media site 306*b* may display the direct buy link. In step 348*b*, the social media site 306*b* may send information to the merchant 304*b* that the link was posted. In step 350*b*, the merchant may reward the consumer 308*b* for posting direct buy link. Consumers 308*b* may, for example, be rewarded for posting and additionally for all purchases made using the link they posted. In some implementations, the reward may be based on how many times the consumer's posting was viewed, the number of times the product and/or service was purchased from the consumer's posting, and/or how influential the consumer's posting was.

The transmitting device 220 of the processing server 102 may electronically transmit a data signal to the data provider 116 using a suitable communication network that is superimposed with a social media data request. The social media data request may include at least the user identifier and corresponding social media site 306*b*, and may also include additional data, such as the product or merchant, a time and/or date range, etc.

The data provider 116 may identify the social media data requested by the processing server 102 and may, electronically transmit a data signal back to the processing server 102 in response that is superimposed with the requested social media data. The social media data may include the number of followers and secondary followers for the consumer 308*b* as well as sharing data related to content shared by the consumer 308*b* that includes a time and date for sharing of content as well as a data value associated with the shared content (e.g., corresponding to a product or merchant included in the request).

The processing server 102 may identify an influence index for the consumer 308*b*. The querying module 214 of the processing server 102 may execute a query on a database to identify transaction messages that were conducted after the sharing of the content, such as where the transaction time and transaction date stored in corresponding data elements included in the transaction message are within a predetermined period of the time and date of the sharing of the content as included in the sharing data, and that involve the product or merchant to which the shared content is associated, such as based on inclusion of the shared data value or data associated therewith in the transaction data in the plurality of additional data elements included in the respective transaction message.

Merchants 304*b* may post direct buy links to their digital sites where visitors and shoppers can copy them and paste in to digital sites they visit or build (social media platforms, blogs, websites etc.). The merchant link may consist of a link to the shopping cart with the item(s) prepopulated. When a purchase is made using the direct buy link the linked shopping cart opens and consumer 308*b* can complete purchase normally by choosing from payment methods (e.g., acceptance networks such as MasterPass and/or by providing card information or logging into merchant's site and using their card on-file with the merchant).

In some implementations, the social media site 306*b* where the link was clicked can further facilitate the payment. If the consumer 308*b* has provided payment credentials or payment preference (e.g., MasterPass acceptance) to the social media platform, it can feed that information back to the merchant 304*b*. This way the selection of the payment method step may be omitted and consumer 308*b* can complete the purchase with one click.

Merchants 304*b* can recognize the shoppers and, if users log into merchant sites also visitors, and those recognized users can be provided user specific direct buy links that they can post into their social media and digital sites. When the incoming direct buy request can be recognized as coming from a recognized consumer 308*b*, then that consumer 308*b* can be rewarded for posting and also for the sale that results from that posting.

Social media and other digital sites (e.g., blogs) where consumers 308*b* can post direct buy links can facilitate the purchase events by injecting the consumer's preferred payment option into the link when it is launched from their site. Since the consumer logs into the site and is therefore a known consumer 380*b*, the social media site 306*b* and/or platform can append the direct buy request with the consumer's payment preference (e.g., card on file information, shipping information, preference for using card on file at the merchant 304*b* and/or an acceptance network such as MasterPass). This enables the social media site 306*b* and/or platform to gain information about the shopping behaviors of their users. In addition it enables them to collaborate with merchants 304*b* and provide the enhanced experience as a chargeable service to merchants.

Exemplary Method for Purchasing from Posts in Social Media Sites

Figure 4A:
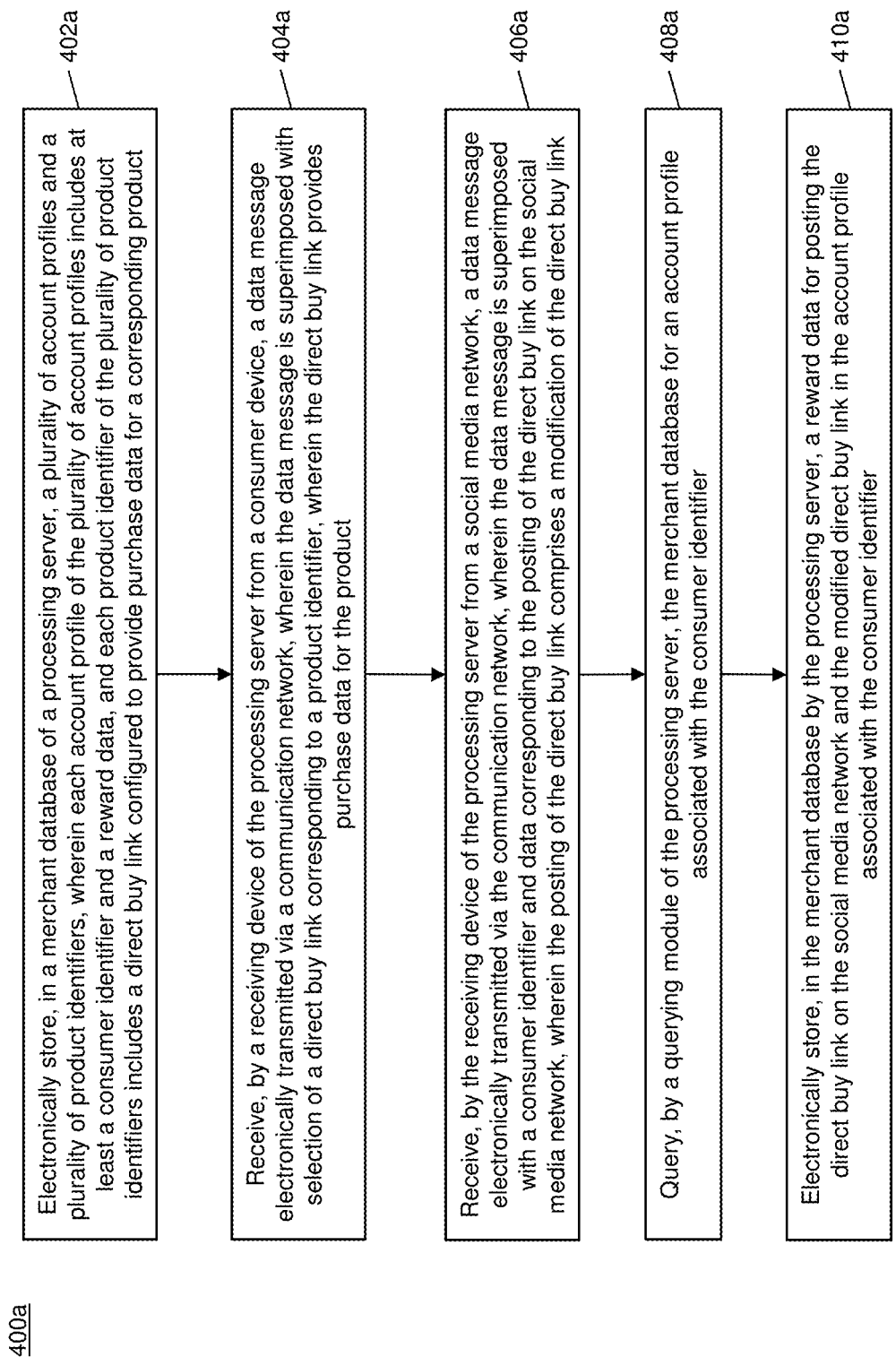
FIGS. 4A and 4B are flow charts illustrating an exemplary method for purchasing from posts in social media sites in accordance with exemplary embodiments.

FIG. 4A is a flow chart 400*a* illustrating an exemplary method for purchasing from posts in social media sites in accordance with exemplary embodiments.

In step 402*a*, a merchant database (e.g., the merchant database 206) of a processing server (e.g., the processing server 102) may electronically store a plurality of account profiles and a plurality of product identifiers. Each account profile of the plurality of account profiles may include at least a consumer identifier and a reward data. Each product identifier of the plurality of product identifiers may include a direct buy link configured to provide purchase data for a corresponding product.

In step 404*a*, a receiving device (e.g., the receiving device 202) of the processing server (e.g., the processing server 102) from a consumer device may receive a data message electronically transmitted via a communication network. The data message may be superimposed with selection of a direct buy link corresponding to a product identifier. The direct buy link may provide purchase data for the product.

In step 406a, the receiving device (e.g., the receiving device 202) of the processing server (e.g., the processing server 102) from a social media network may receive a data message electronically transmitted via the communication network. The data message may be superimposed with a consumer identifier and data corresponding to the posting of the direct buy link on the social media network. The posting of the direct buy link may comprise a modification of the direct buy link.

In step 408a, a querying module (e.g., the querying module 214) of the processing server (e.g., the processing server 102) may query the merchant database (e.g., the merchant database 206) for an account profile associated with the consumer identifier. In step 410 a, the merchant database (e.g., the merchant database 206) by the processing server (e.g., the processing server 102) may electronically store a reward data for posting the direct buy link on the social media network and the modified direct buy link in the account profile associated with the consumer identifier.

Figure 4B:
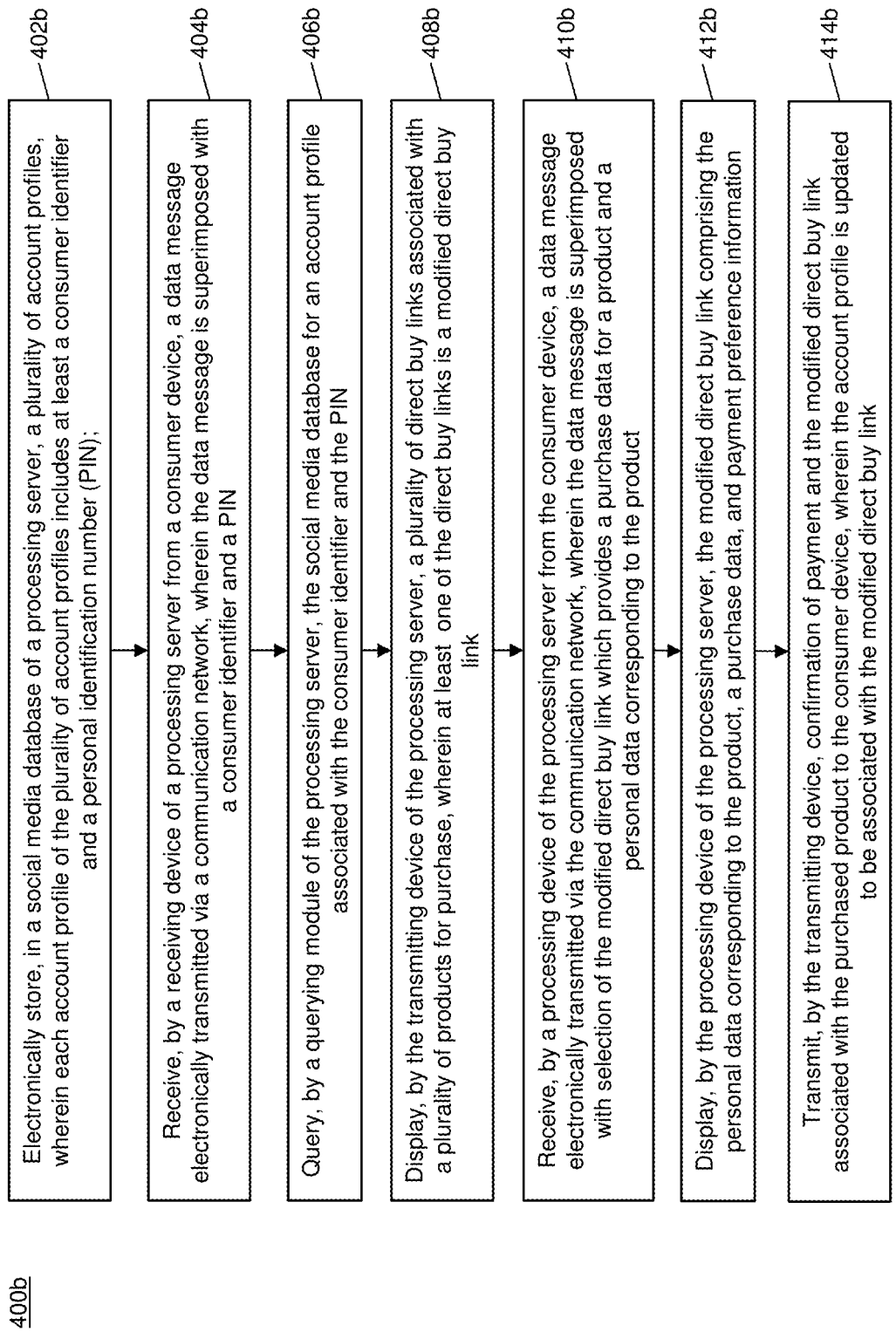

FIG. 4B is a flow chart 400b illustrating an exemplary method for purchasing from posts in social media sites in accordance with exemplary embodiments.

In step 402b, a social media database (e.g., social media database 210) of a processing server (e.g., the processing server 102) may electronically store a plurality of account profiles. Each account profile of the plurality of account profiles may include at least a consumer identifier and a personal identification number (PIN). In step 404b, a receiving device (e.g., receiving device 202) of a processing server (e.g., the processing server 102) from a consumer device may receive, a data message electronically transmitted via a communication network. The data message may be superimposed with a consumer identifier and a PIN.

In step 406b, a querying module (e.g., querying module 214) of the processing server (e.g., the processing server 102) may query the social media database (e.g., social media database 210) for an account profile associated with the consumer identifier and the PIN. In step 408b, the transmitting device (e.g., the transmitting device 220) of the processing server (e.g., the processing server 102) may display a plurality of direct buy links associated with a plurality of products for purchase. At least one of the direct buy links may be a modified direct buy link. In step 410b, the processing device (e.g., the processing device 218) of the processing server (e.g., the processing server 102) may receive from the consumer device, a data message electronically transmitted via the communication network. The data message may be superimposed with selection of the modified direct buy link which provides a purchase data for a product and a personal data corresponding to the product.

In step 412, the processing device (e.g., the processing device 218) of the processing server (e.g., the processing server 102) may display the modified direct buy link comprising the personal data corresponding to the product, a purchase data, and payment preference information. In step 414b, the transmitting device (e.g., the transmitting device 220) of the processing server (e.g., the processing server 102) may transmit confirmation of payment and the modified direct buy link associated with the purchased product to the consumer device. The account profile may be updated to be associated with the modified direct buy link.

Payment Transaction Processing System and Process

Figure 5:
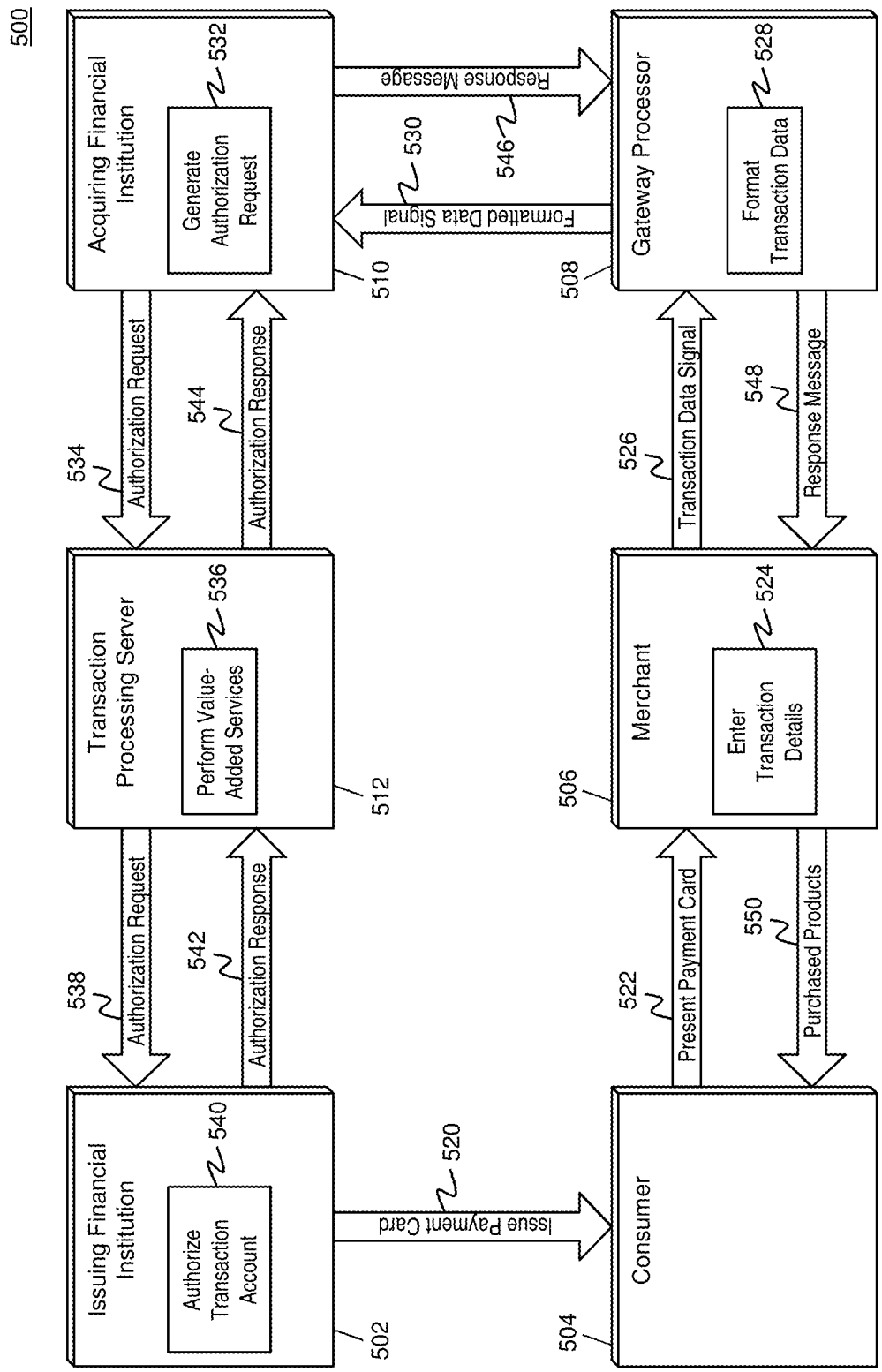
FIG. 5 is a flow diagram illustrating the processing of a payment transaction in accordance with exemplary embodiments.

FIG. 5 illustrates a transaction processing system and a process 500 for the processing of payment transactions in the system. The process 500 and steps included therein may be performed by one or more components of the system 100 discussed above, such as the consumer 110, followers, secondary followers, merchants 104, payment network 118, etc. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the processes illustrated in FIGS. 3A, 3B, 4A and 4B, discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 502 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 502. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution 502. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
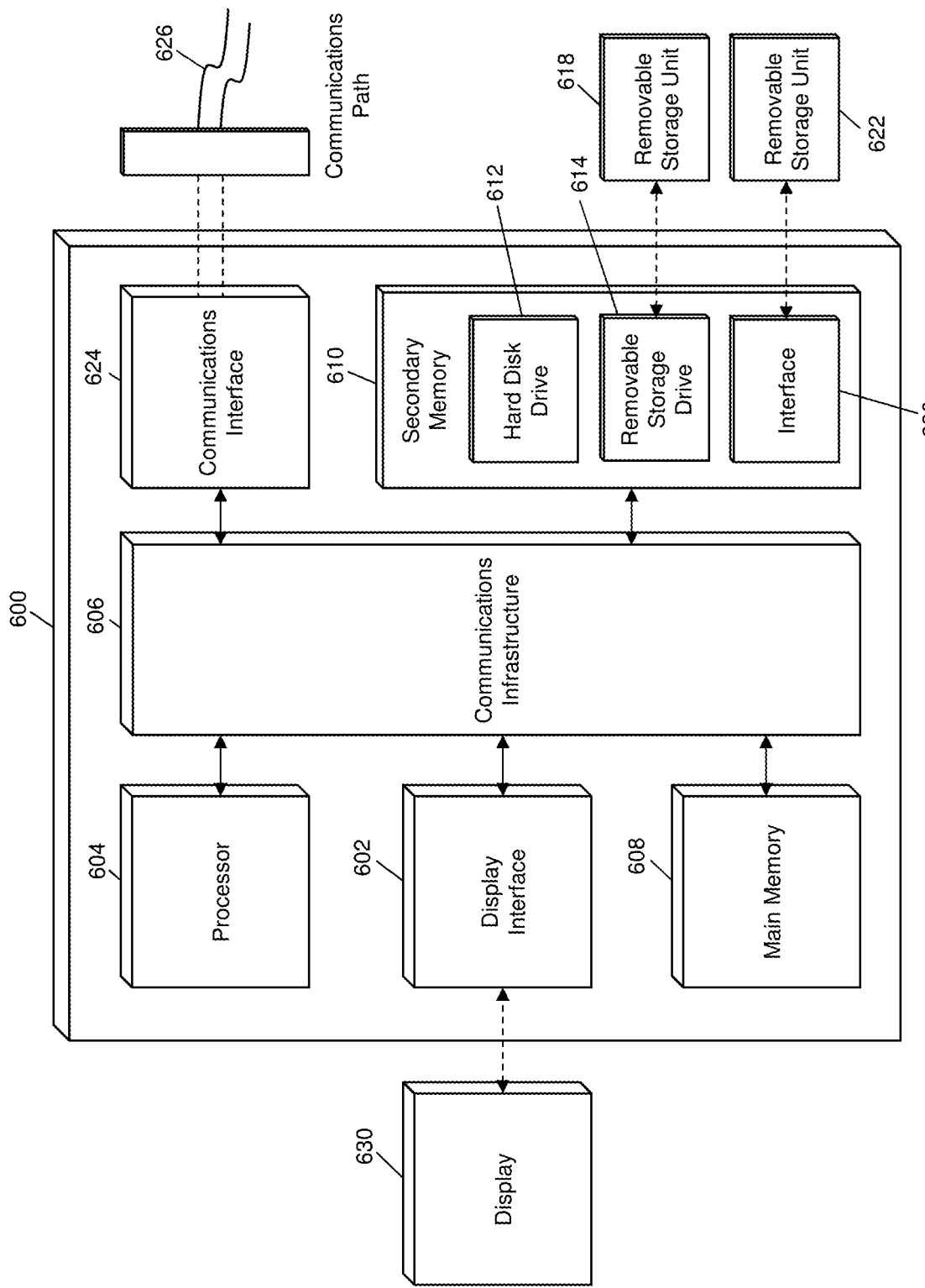
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for generation of an index of influence for an individual using social network and electronic transaction data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for posting a direct buy link on a social media site, comprising:
   storing, in a merchant database of a processing server, a plurality of account profiles and a plurality of product identifiers, wherein each account profile of the plurality of account profiles includes at least a consumer identifier and reward data, and each product identifier of the plurality of product identifiers includes a direct buy link configured to provide purchase data for a corresponding product;
   receiving, by a receiving device of the processing server from a consumer device, a data message electronically transmitted via a communication network, wherein the data message includes at least a first consumer identifier of a consumer having visited a website associated with the processing server, and an identifier of the operation performed by the first user;
   querying, by a querying module of the processing server, the merchant database for an account profile associated with the first consumer identifier;
   sending, by a transmitting device of the processing server to the consumer device, a data message electronically transmitted via the communication network, wherein the data message includes a plurality of direct buy links for display on the consumer device, the direct buy links being included in the data message based on an account profile of the first consumer identifier, and wherein at least one of the plurality of direct buy links is modified to include product information for more than one corresponding products and at least one personal image of the product posted by the consumer;

receiving, by the receiving device of the processing server from the consumer device, a data message electronically transmitted via the communication network, wherein the data message includes a selection of at least one of the modified direct buy links corresponding to more than one product identifiers, wherein the product information in the at least one modified selected direct buy link includes purchase data for the more than one corresponding products, wherein the purchase data includes one or more of size data of the product, an image of the product, a price of the product, a product description of the product, and a Quantity of the product, and the modified direct buy link includes updated purchase data including one or more of: an additional image of each product, a replacement image of each product, and a modified description of each product;

receiving, by the receiving device of the processing server from a social media network, a data message electronically transmitted via the communication network, wherein the data message includes the first consumer identifier and data corresponding to a posting of at least one of the selected modified direct buy links on the social media;

electronically storing, in the account profile associated with the first consumer identifier in the merchant database of the processing server, the reward data for posting at least one of the selected modified direct buy links on the social media network.

2. The method of claim 1, wherein the modification of the direct buy link is received from the consumer device via the social media network.

3. The method of claim 1, wherein selection of at least one modified direct buy links is from one or more of: a product page, and a checkout page.

4. The method of claim 1, wherein the reward data comprises one or more of: a coupon towards next purchase, merchant cash redeemable towards next purchase, and free products provided by the merchant.

5. The method of claim 1, wherein the data message including a plurality of direct buy links for display on the consumer device includes at least one modified direct buy link associated with a second consumer identifier.

6. The method of claim 5, wherein the at least one modified direct buy link includes at least one of an additional image of the corresponding product, a new image of the corresponding product, or a modified description of the corresponding product.

7. A method for shopping from a social media site using a direct buy link, comprising:

electronically storing, in a social media database of a processing server, a plurality of account profiles, wherein each account profile of the plurality of account profiles includes at least a consumer identifier and a personal identification number (PIN);

receiving, by a receiving device of a processing server from a consumer device, a data message electronically transmitted via a communication network, wherein the data message includes at least a first consumer identifier and a consumer identifier and a PIN of a consumer having visited a website associated with the processing server;

querying, by a querying module of the processing server, the social media database for an account profile associated with the first consumer identifier and a corresponding PIN;

sending, by a processing device of the processing server to the consumer device, a data message electronically transmitted via the communication network, wherein the data message includes a plurality of direct buy links associated with a plurality of products for purchase, wherein at least one of the direct buy links is a modified direct buy link and each direct buy link is included in the data message based on an account profile of the first consumer identifier, the modified direct buy link including at least product;

receiving, by the receiving device of the processing server from the consumer device, a data message electronically transmitted via the communication network, wherein the data message includes the selected the modified direct buy link which provides purchase data for each corresponding product and at least one personal image of the product posted by the consumer;

displaying, by the processing device of the processing server, the modified direct buy link comprising the personal data corresponding to the product, a purchase data, and payment preference information associated with the first consumer identifier, wherein the purchase data comprises one or more of: a size data of the product, an image of the product, a price of the product, a product description of the product, and a quantity of the product, and the personal data corresponding to the product comprises one or more of: providing the personal image of the product, replacing an original image of the product with the personal image, and modifying the description of the product; and transmitting, by a transmitting device of the processing server, confirmation of payment and the modified direct buy link associated with the purchased product to the consumer device, wherein the account profile is updated to be associated with the modified direct buy link.

8. The method of claim 7, wherein the modification of the direct buy link is received from the consumer device via the social media network.

9. A system for posting a direct buy link on a social media site, comprising:

a merchant database of a processing server configured to store a plurality of account profiles and a plurality of product identifiers, wherein each account profile of the plurality of account profiles includes at least a consumer identifier and reward data, and each product identifier of the plurality of product identifiers includes a direct buy link configured to provide purchase data for a corresponding product;

a receiving device of the processing server configured to receive from a consumer device a data message electronically transmitted via a communication network, wherein the data message includes at least a first consumer identifier of a consumer having visited a website associated with the processing server;

a transmitting device of the processing server configured to transmit to the consumer device a data message electronically transmitted via the communication network, wherein the data message includes a plurality of direct buy links for display on the consumer device, the direct buy links being included in the data message based on an account profile of the first consumer identifier, at least one of the plurality of direct buy links is modified to include product information for more than one corresponding products, wherein the purchase data includes one or more of size data of the product, an image of the product, a price of the product, a product description of the product, and a Quantity of the product, and the modified direct buy link includes updated purchase data including one or more of: an additional image of each product, a replacement image of each product, and a modified description of each product;

the receiving device of the processing server configured to receive from a consumer device a data message electronically transmitted via a communication network, wherein the data message includes at least a selected one of the modified direct buy links corresponding to more than one product identifier, wherein the direct buy link is modified to provide purchase data for the more than one corresponding products and at least one personal image of the product posted by the consumer;

the receiving device of the processing server further configured to receive from a social media network a data message electronically transmitted via the communication network, wherein the data message includes the first consumer identifier and data corresponding to posting of the modified direct buy link on the social media network, wherein the modified direct buy link is associated with the first consumer identifier or a second consumer identifier;

the merchant database of the processing server further configured to electronically store the reward data for posting the direct buy link on the social media network and the modified direct buy link in the account profile associated with the consumer identifier.

10. The system of claim 9, wherein the modification of the direct buy link is received from the consumer device via the social media network.

11. The system of claim 9, wherein selection of at least the modified direct buy link is from one or more of: a product page, and a checkout page.

12. The system of claim 9, wherein the reward data comprises one or more of: a coupon towards next purchase, merchant cash redeemable towards next purchase, and free products provided by the merchant.

13. A method for shopping from a social media site using a direct buy link, comprising:

a social media database of a processing server configured to electronically store a plurality of account profiles, wherein each account profile of the plurality of account profiles includes at least a consumer identifier and a personal identification number (PIN);

a receiving device of a processing server configured to receive from a consumer device, a data message electronically transmitted via a communication network, wherein the data message includes a first consumer identifier and a PIN of a consumer having visited a website associated with the processing server;

a querying module of the processing server configured to query the social media data base for an account profile associated with the consumer identifier and the PIN;

a processing device of the processing server configured to control a display of a plurality of direct buy links associated with a plurality of products for purchase on the consumer device, wherein at least one of the direct buy links is a modified direct buy link and each direct buy link is displayed based on an account profile of the first consumer identifier;

a receiving device configured to receive a data message electronically transmitted via the communication network, wherein the data message includes a selected one of the modified direct buy links which provides a purchase data for more than one corresponding products and at least one personal image of the product posted by the consumer;

the processing device further configured to display the modified direct buy link comprising the personal data corresponding to each product, purchase data associated with each product, and payment preference information, wherein the purchase data comprises one or more of: a size data of the product, an image of the product, a price of the product, a product description of the product, and a quantity of the product, and the personal data corresponding to the product comprises one or more of: providing the personal image of the product, replacing an original image of the product with the personal image, and modifying the description of the product; and a transmitting device configured to transmit confirmation of payment and the modified direct buy link associated with the purchased products to the consumer device, wherein the account profile is updated to be associated with the modified direct buy link.

14. The system of claim 13, wherein the modification of the direct buy link is received from the consumer device via the social media network.

* * * * *